United States Patent [19]
Wagner

[11] 3,867,105
[45] Feb. 18, 1975

[54] DAMPED SUPPORT SCREEN FOR CATALYTIC CONVERTER

[75] Inventor: Melvin H. Wagner, Bartlett, Ill.

[73] Assignee: Universal Oil Products Company, Des Plaines, Ill.

[22] Filed: Oct. 29, 1973

[21] Appl. No.: 410,670

Related U.S. Application Data

[63] Continuation-in-part of Ser. No. 386,804, Aug. 8, 1973, abandoned.

[52] U.S. Cl. ............... 23/288 F, 23/288 R, 55/518, 55/501, 55/492, 248/346, 60/299
[51] Int. Cl. .............................................. B01j 9/04
[58] Field of Search ......... 23/288 F, 288 R; 55/518, 55/490, 516, 501, 492; 248/346; 210/463, 478, 479; 60/299, 300

[56] References Cited
UNITED STATES PATENTS

| | | | |
|---|---|---|---|
| 890,704 | 6/1908 | Peterson | 55/518 X |
| 2,404,574 | 7/1946 | Hammond | 23/288 R |
| 3,034,869 | 5/1962 | Peterson | 23/288 R |
| 3,307,920 | 3/1967 | Barnes | 23/288 F |

Primary Examiner—James H. Tayman, Jr.
Attorney, Agent, or Firm—James R. Hoatson, Jr.; Barry L. Clark; William H. Page, II

[57] ABSTRACT

Support screens for retaining particulate catalyst in a catalytic converter are made highly resistant to fatigue failure which is caused by vibration from exhaust gas pulses. The screens are strengthened by welding formed support wires at a single center point to the downstream face of each screen. The wires are integral with the screen only at its center. Other portions of the wires are positioned in recesses in the housing walls where they prevent axial movement of the screens. The portions of the wires within the recesses are free to expand or contract independently of the material of the screen. The limited degree of connection between the wires and a screen prevents the wires and screen, which have different natural frequencies, from vibrating as a composite unit. Furthermore, any tendency toward separate vibration of the wires and screen is damped due to the contact between the wires and screen. By embossing the screen at its center and placing a metal disk on the side of the wires opposite the screen it is possible to use high energy discharge resistance welding techniques to achieve a screen-support composite having much greater deflection resistance than is possible by ordinary welding.

14 Claims, 8 Drawing Figures

PATENTED FEB 18 1975 3,867,105

DAMPED SUPPORT SCREEN FOR CATALYTIC CONVERTER

CROSS REFERENCE TO RELATED APPLICATION

This is a continuation-in-part of Ser. No. 386,804, filed Aug. 8, 1973 and now abandoned.

BACKGROUND OF THE INVENTION

It has been known for many years that a catalytic converter can be a very effective means for reducing automotive exhaust pollution. The extremely severe temperature environment of an exhaust path, coupled with vibratrions, especially those produced by the opening of the engine exhaust valves, makes it necessary that the converter be very rugged if it is to have any degree of longevity. A wide disparity in driving habits and owner attention to engine manintenance makes it necessary to design converters for the worst possible operating conditions. To make a converter more durable, it has been common practice to make it out of stainless steel, which has greater resistance to oxidation than carbon steel. For catalytic converter sizes designed for automotive engine applications, the span of the catalyst support screen is such that it is necessary to provide a screen of relatively heavy gauge, or to weld a series of reinforcing ribs to the screen, or to generate embossed rib sections in the screen. The latter procedures are normally followed in view of a desire to reduce the mass of metal available to absorb heat and thus reduce the time required for the catalyst to reach operating temperature. Regardless of whether the screen is strengthened by being made of heavier gauge material, or by welding ribs to it, its natural frequency appears to be in a range where the frequency of common engine virbrations causes the screen to vibrate in modes that result in premature failure, especially under extremely severe operating conditions.

SUMMARY

It is among the objects of the present invention to provide a simple, inexpensive and durable support screen for particulate type catalysts.

These and other objects are achieved by the support screen and mounting arrangements of the present invention wherein a series of reinforcing support wires or ribs or portions thereof are provided on the downstream side of the screen. The wires are welded to the screens at or near the centers of the screens but are free for the major portion of their length. Thus, the wires provide support for the screen across the entire diameter of the screen but are free to expand, contract or vibrate relative to the screen in the regions of the screen other than the weld region, and especially at the outer edges of the screen. In a preferred embodiment, the various support wires are welded by ultra pulse welding techniques to each other and to the screen only at the center of the screen where the wires are contacted by an embossed area of the screen on their inlet side and by a flat disc on their outlet side.

In vibration tests of converters, sweeping a wide range simulating pulsating inlet gas frequencies, it has been found that the method described herein inhibits the screen and support components from responding or reaching a common resonant frequency, thus substantially reducing the possibilty of fatigue induced mechanical failure. Similar tests with conventionally ribbed screens and with unribbed screens showed resonant vibration taking place within the normal frequency range to which the converter is subjected. Apparently, the screen and support wires damp out each other's vibrations when they are joined together at a single point.

Another advantage of the disclosed support arrangement resides in the fact that by making the rib supports from circular cross-section wire, there is a very small reduction in the open area of the screen as compared to an arrangement utilizing non-round wire and either continuous welds or a large number of welds. Free access of incoming gas to the entire catalyst bed is important to maximize the efficiency of the converter since catalyst located behind blocked screen openings will not be effectively utilized.

BRIEF DESCRIPTION OF THE PREFERRED EMBODIMENT

Figure 1:
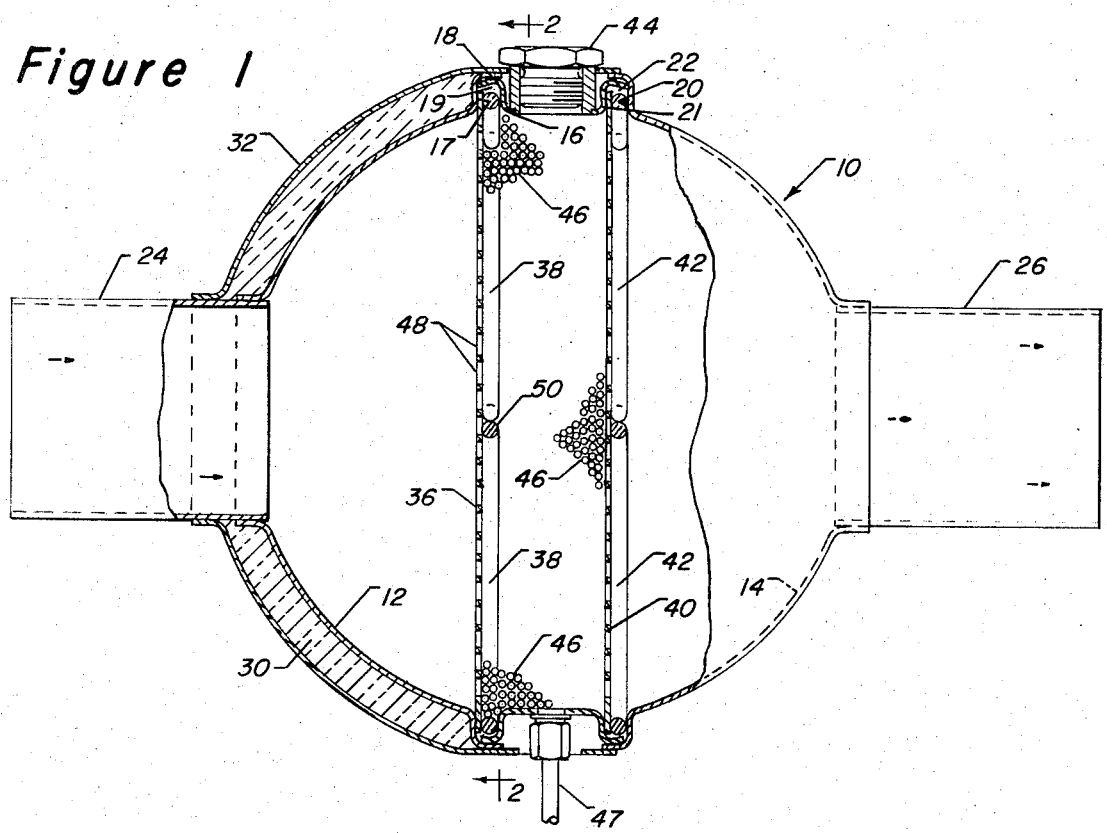
FIG. 1 is a side cross-sectional view of a dome-shaped catalytic converter.

Referring to FIG. 1, a catalytic converter indicated generally at 10 includes a domed inlet shell member 12, a domed outlet shell member 14 and a generally cylindrical central shell portion 16 welded at its opposite ends to the inlet and outlet shells 12, 14. The inlet shell member 12 has a flange portion 17 which cooperates with a flange portion 18 on the central member 16 to form a recess 19. Similarly, a flange 20 on outlet shell 14 cooperates with a flange 21 on the central member 16 to form a recess 22. A tubular inlet member 24 is welded to the inlet shell 12 and constitutes a path for inlet exhaust gases into the converter housing 10. A tubular outlet member 26 is welded to the outlet shell 14 and constitutes the path by which exhaust gases leave the converter housing. The converter housing 10 is preferably located extremely close to the engine exhaust manifold and in the vicinity of various wires, tubes and other members associated with the engine which could be damaged by the heat generated within the converter. To reduce the heat radiated by the converter housing, the housing is preferably insulated on at least its inlet side by a layer of insulation 30 surrounded by an outer shell member 32.

Positioned within the housing 10 and circumferentially retained against axial and radial movement by recess or groove portion 19 is an inlet screen member 36 which is backed up on its downstream side and reinforced by a plurality of support rib members 38. Downstream from inlet screen 36 is an outlet screen 40 and a plurality of outlet screen support ribs 42 which are supported circumferentially against radial and axial movement by recess or groove portion 22. A sealing plug 44 is screwed into the central shell portion 16 and is provided for permitting the space between the inlet and outlet screens 36, 40 to be filled with catalyst pellets 46. A thermocouple member 47 is also threaded into engagement with the central shell portion 16 so that the temperature of the catalyst bed may be measured.

Figure 2:
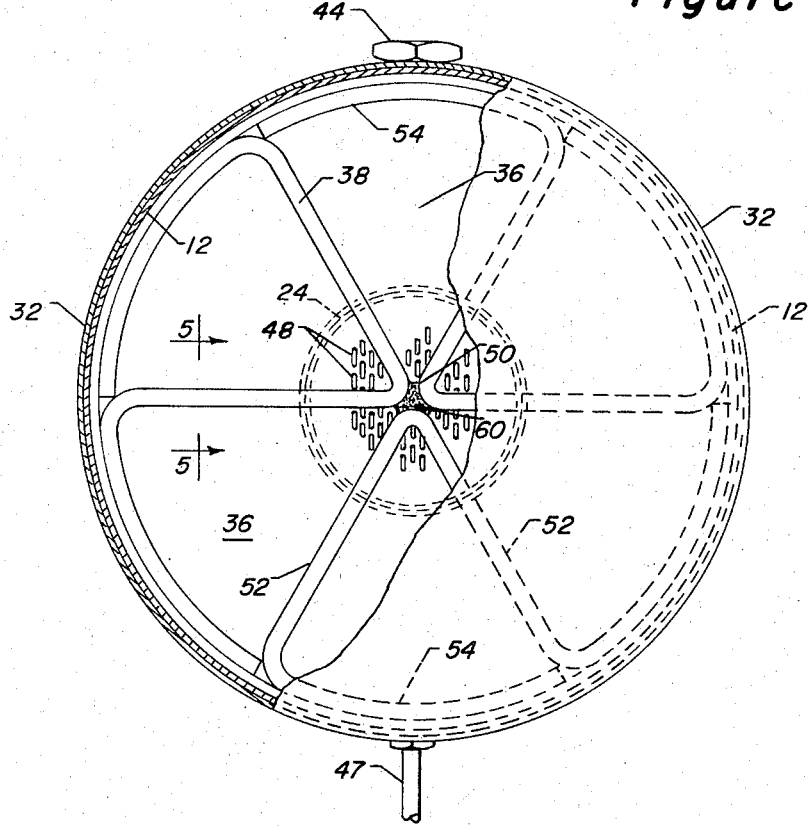
FIG. 2 is a fragmentary sectional end view taken on line 2—2 of FIG. 1.

Referring to FIG. 2, the catalyst retaining screen element 36 is provided with a plurality of elongated screen openings 48 through which the exhaust gases pass in order to contact the catalyst pellets 46. The support rib memberes 38 which reinforce the scren element 36 are preferably formed of round wire which is bent in the manner shown so as to provide an inner rib portion 50, radial rib portions 52 and peripheral rib portions 54. The inner rib portions 50 of the three support rib members 38 are welded to each other and to the screen member 36 by a weld bead 60. Since the weld bead 60 is at the center of the screen 36 it serves to join together the inner rib portions 50 of the various support rib members 38 so that radial rib portions 52 of the latter are combined to form a plurality of single ribs extending across the entire diameter of the screen member 36. As previously explained, the support members 38 are free to expand and contract relative to the screen member 36 except where they are welded at 60. Thus, they support the screen 36 but, except for their small point of attachment to the screen 36, do not have the same natural frequency of vibration as the screen vibrations nor do they have any tendency to vibrate in sympathy with the screen as they would if they were welded to it throughout their length. Since the support ribs 38 are in physical contact with the screen 36, the ribs and screen tend to cooperate with each other to damp out any vibrations in either of them rather than amplify them. Thus, the composite member 39 comprising the screen 36 and support members 38 is very durable and resistant to the large vibratory pulses of the exhaust gases which constantly impinge upon it.

Figure 3:
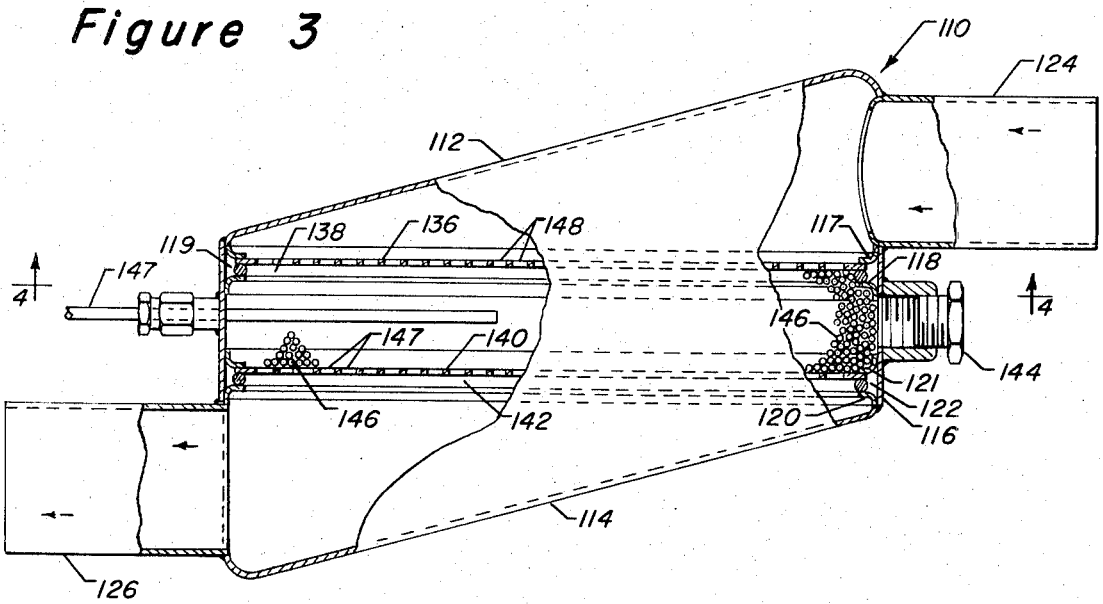
FIG. 3 is a side sectional view of a flat bed type of catalytic converter.

FIG. 3 is a side sectional view of a modified form of catalytic converter having elements 110 through 147 which correspond to the respectively numbered elements 10 – 47 in FIG. 1. The FIG. 3 embodiment is of a flat bed design as compared to the generally spherical design of FIG. 1 and may be used when there is a need to accommodate additional catalyst or where space requirements make it impossible to use the FIG. 1 design.

Figure 4:
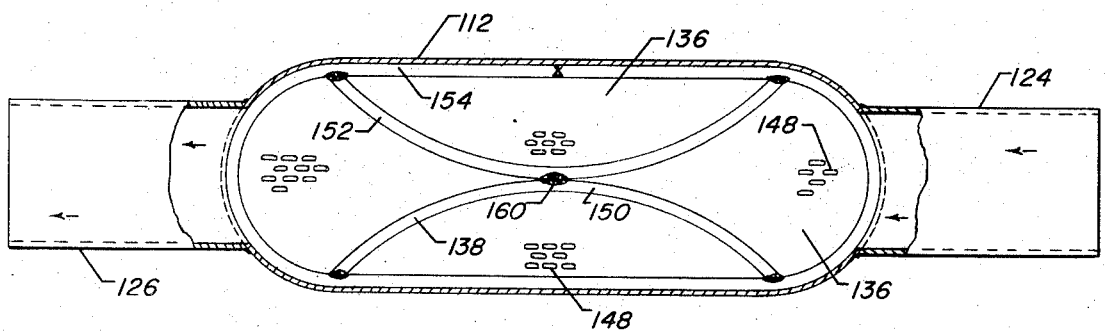
FIG. 4 is a top sectional view taken on line 4—4 of FIG. 3.

FIG. 4 shows a top view of the inlet screen 136 which has a plurality of screen openings 148 in its surface. The support rib member 138 in this embodiment differs somewhat in shape from the members 38 shown in FIG. 2 but operates on the same principle in that it is only attached to the screen member 136 at central weld areas 160. The support rib member 138 includes central rib portions 150, outwardly extending rib portions 152 and a generally obround shaped peripheral portion 154. The various portions,, 150, 152, and 154 are preferably welded together to form the rib member 138 which is then welded to the screen member 136 at central area 160 to form a composite reinforced screen member 139.

Figure 5:
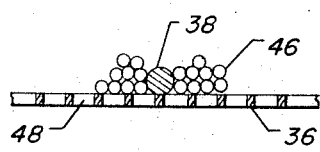
FIG. 5 is a sectional view taken on line 5—5 of FIG. 2.
Figure 6:
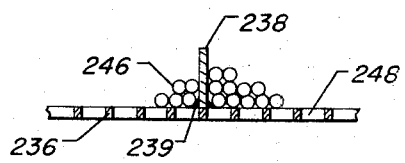
FIG. 6 is a view similar to FIG. 5 but showing a prior art screen support.

The advantage of the circular cross sectioned support ribs 38 is readily evident in FIG. 5 wherein it can be seen that exhaust gases passing through openings 48 are restricted little if at all by the lower edge of rib 38 which has only a line contact with the surface of the screen element 36. This free movement of gases can be compared with the restriction inherent in the prior art design shown in FIG. 6 wherein the square cornered bottom of support ribs 238 provides interference with the movement of exhaust gases through openings 248 in the screen element 236. In addition, the weld beads 239 provide an obstruction to the flow of exhaust gases in the vicinity of the ribs. Such a design is obviously less efficient since some of the catalyst 246 is not being acted upon by the exhaust gases.

Figure 7:
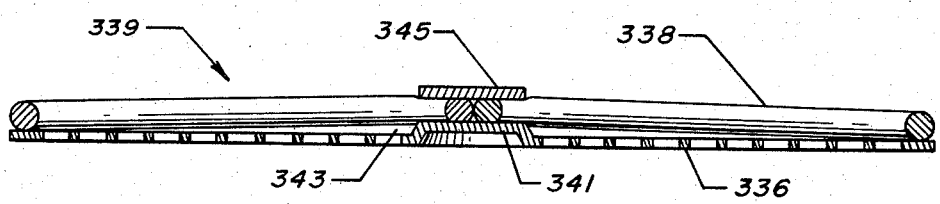
FIG. 7 is a side cross-sectional view of a modified form of damped support screen.
Figure 8:
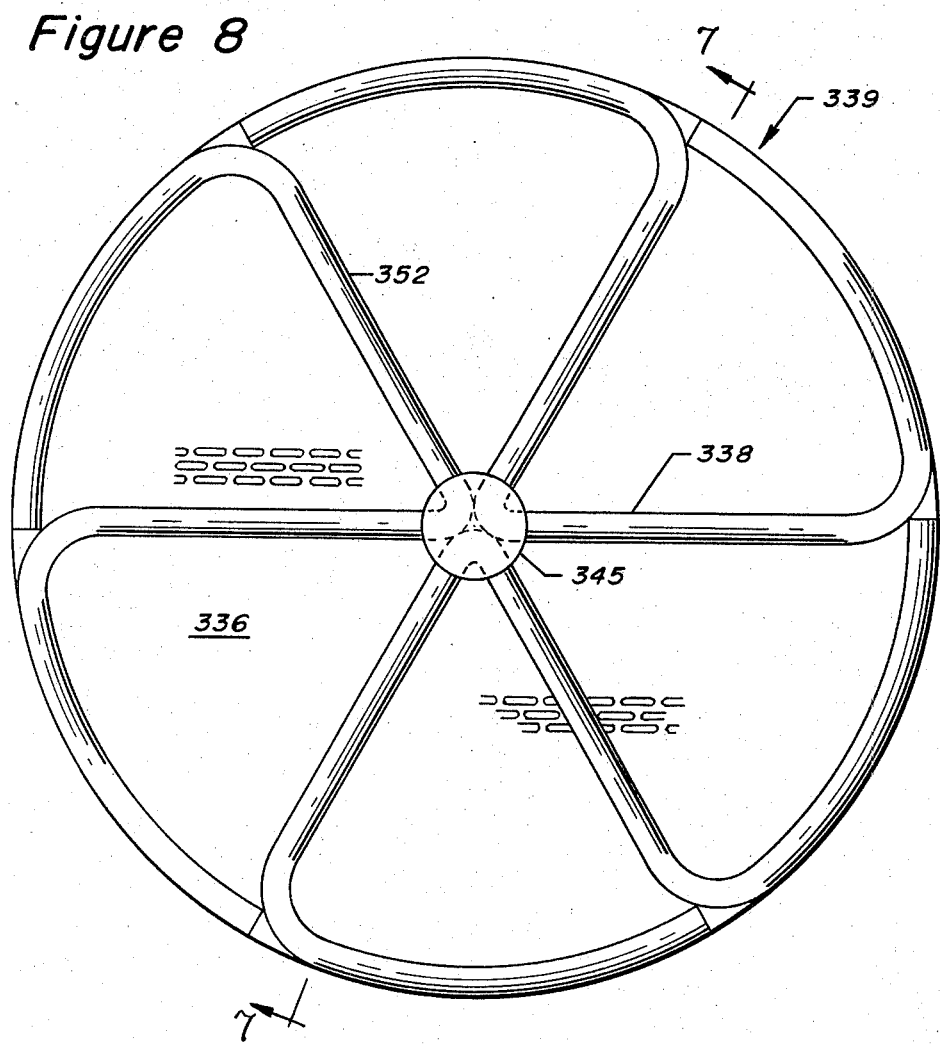
FIG. 8 is an end view of the damped support screen of FIG. 7.

FIGS. 7 and 8 show a modified form of damped support screen indicated generally at 339 comprising a perforated screen 336 and ribs 338 which is quite similar to the screen composite 39 shown in FIGS. 1 and 2 comprising screen 36 and ribs 38. The modified screen assembly 339 differs from the screen assembly 39 in the way in which the screen member 336 and ribs 338 are welded. Whereas the screen member 36 of FIG. 2 is welded to tip portions 50 of ribs 38 by a weld bead 60, such as that produced with a welding rod (not shown) in a rather slow manual procedure, screen assembly 339 can be welded very rapidly and uniformly in an automated fashion by high energy discharge resistance welding techniques. To confine the weld area to the center of the screen member 336, the screen is embossed at its center to define a flat surface 341 of about 0.625 in. diameter which produces a gap 343 of about 0.015 in. between the screen 336 and the inlet side of the ribs 338 at a location immediately radially outwardly of the surface 341. A disk 345 of about 0.750 in. diameter is placed in contact with the outlet side of the ribs 338 at the center of the screen assembly 339 and on the opposite side of the ribs 338 from the flat surface 341. Welding is accomplished by use of high energy discharge resistance welding equipment such as the Ultrapulse welding equipment manufactured by Quanta Welding Company of Troy, Mich. By use of such equipment a welding head anode preload of about 6,250 pounds is applied to the embossed area 341 while the disk or washer 345 is backed up by an anvil. Since the welding current of about 50,000 amperes is applied for only a very short period, such as 10 milliseconds, the welding operation is very quick and the heat is localized so that completed parts may be easily removed by their outer edges from a welding fixture (not shown). The disk 345 and boss 341 increase the rigidity of the structure 339 as compared to the structure 39 of FIG. 2 since they sandwich portions of the ribs 338 between them and provide a much stiffer connection between pairs of aligned radial ribs 352 than the weld 60 of FIG. 2. The screen 336, ribs 338 and disk 345 are preferably made of the same metal. For high temperature corrosion resistance, type 304 stainless steel has been found to be quite suitable. Good results have been achieved where the screen 336 is 0.050 – 0.070 in. thickness material, the ribs or wires 338 are of 3/16 in. thickness, and the disk 345 is ¾ in. diameter and 1/16 in. thickness.

Although the modification of FIGS. 7 and 8 has been shown in use with a screen support having a circular configuration, it will be readily appreciated that the concept of providing an embossed area on the screen and a similarly shaped disk member can be applied to other styles of screens such as the oblong type shown in FIGS. 3 and 4.

I claim as my invention:

1. In a catalytic converter having a metal housing and a pair of catalyst retaining support screens retained against axial movement by radially extending portions of the inner wall of the housing, the improvement comprising rib support means including a plurality of rib portions extending outwardly from the central portion of at least one of said support screens and generally parallel to said support screen for strengthening said support screen, said rib support means being integrally attached to said at least one support screen only at said central portion thereof, the radially outermost portions of said rib support means being retained against axial movement by said radially extending portions of the inner wall of the housing, said radially outermost portions of said rib support means being free to move radially relative to said at least one screen as the temperature of said screen and rib support means changes.

2. A catalytic converter in accordance with claim 1 wherein said rib support means is formed from wire having a circular cross-section.

3. A catalytic converter in accordance with claim 1 wherein said rib support means comprises at least one rib support member having central, peripheral and radial portions.

4. A catalytic converter in accordance with claim 1 wherein said rib support means comprises a plurality of rib support members each member being bent so as to form central, peripheral and radial portions.

5. A catalytic converter in accordance with claim 4 wherein each member includes a pair of radial portions and a pair of peripheral portions.

6. A catalytic converter in accordance with claim 5 wherein each member is bent so as to form three sides of a pie shaped area and two sides of an adjacent pie shaped area.

7. A catalytic converter in accordance with claim 6 wherein said rib support means comprises three rib support members having their central portions welded to each other and to said screen.

8. A catalytic converter in accordance with claim 1 wherein said central portion of said support screen is embossed so as to lie in a plane which is axially spaced from the immediately adjacent areas of said screen, said embossed central portion contacting one side of said rib support means and a metal disk contacting the other side of said rib support means, said screen, rib support means and disk being welded together.

9. A catalytic converter in accordance with claim 8 wherein said disk is of less thickness than said screen and said rib support means.

10. A catalytic converter in accordance with claim 7 wherein said central portion of said support screen is embossed so as to lie in a plane which is axially spaced from the immediately adjacent areas of said screen, said embossed central portion contacting, and being welded to one side of said three rib support members and a metal disk contacting, and being welded to the other side of said three rib support members.

11. A catalytic converter in accordance with claim 10 wherein said disk is of less thickness than said screen and said rib support members.

12. A catalytic converter in accordance with claim 1 wherein said at least one support screen has a generally oblong shape, said rib support means comprising an oblong peripheral frame portion adapted to engage said radially extending portion of the inner wall of the housing and a pair of curved generally radially extending portions which are welded to said peripheral frame portions at their ends and welded to each other and to said screen only at a central portion of the screen.

13. A catalytic converter in accordance with claim 12 wherein said central portion of said screen is embossed so as to lie in a plane which is axially spaced from the immediately adjacent areas of said screen.

14. A catalytic converter in accordance with claim 13 wherein a thin metal disk member is welded to said rib support means on the surface thereof immediately opposite to the surface which is welded to said central portion of said at least one screen.

* * * * *